(12) United States Patent
Wunderle et al.

(10) Patent No.: US 11,468,490 B2
(45) Date of Patent: Oct. 11, 2022

(54) METHOD FOR PROVIDING A CUSTOMIZED PRODUCT RECOMMENDATION

(71) Applicant: The Gillette Company LLC, Boston, MA (US)

(72) Inventors: Mary Katherine Wunderle, Boston, MA (US); Rose Yin, Bridgewater, NJ (US)

(73) Assignee: The Gillette Company LLC, Boston, MA (US)

( * ) Notice: Subject to any disclaimer, the term of this patent is extended or adjusted under 35 U.S.C. 154(b) by 530 days.

(21) Appl. No.: 16/741,158

(22) Filed: Jan. 13, 2020

(65) Prior Publication Data
US 2020/0226660 A1    Jul. 16, 2020

Related U.S. Application Data

(60) Provisional application No. 62/791,047, filed on Jan. 11, 2019.

(51) Int. Cl.
*G06F 3/0484* (2022.01)
*G06Q 30/06* (2012.01)
*G06V 40/16* (2022.01)

(52) U.S. Cl.
CPC ..... *G06Q 30/0631* (2013.01); *G06Q 30/0643* (2013.01); *G06V 40/166* (2022.01); *G06V 40/169* (2022.01); *G06V 40/171* (2022.01)

(58) Field of Classification Search
CPC .................................................. F06Q 30/0631
USPC .............................................................. 705/26.7
See application file for complete search history.

(56) References Cited

U.S. PATENT DOCUMENTS

| 11,172,873 | B2* | 11/2021 | Purwar | A45D 44/005 |
| 2017/0182095 | A1 | 6/2017 | Terskikh | |
| 2017/0270970 | A1* | 9/2017 | Ho | G06F 16/583 |
| 2018/0268595 | A1* | 9/2018 | Sarna | G06T 13/80 |
| 2022/0245926 | A1* | 8/2022 | Huang | G06V 10/40 |

FOREIGN PATENT DOCUMENTS

| IN | 20171102660 A | 3/2019 |
| WO | WO-2022056198 A1 * | 3/2022 |

\* cited by examiner

*Primary Examiner* — Ruay Ho
(74) *Attorney, Agent, or Firm* — Kevin C. Johnson (57) ABSTRACT

A digital facial image from a user is collected. Digital facial images from a plurality of people are collected from a database. A neural network is used to compare a plurality of pixels of the digital facial image of the user to a plurality of pixels of the digital facial images from a plurality of people to determine a facial shape type of the user. A neural network is used to compare the plurality of pixels from the digital facial image of the user to the digital facial images from a plurality of people to determine an ability of the user to grow hair in an area of the user's face. A facial hair style is recommended to the user based on the facial shape type of the user and the ability of the user to grow hair in an area of the user's face.

19 Claims, 7 Drawing Sheets

METHOD FOR PROVIDING A CUSTOMIZED PRODUCT RECOMMENDATION

FIELD OF THE INVENTION

The present invention relates generally to systems and methods for providing customized product recommendations and specifically to systems and methods for providing customized facial hair product recommendations for a user from information collected from the user and a database.

BACKGROUND OF THE INVENTION

A wide variety of products are marketed for cutting, removing, styling, cleaning and conditioning hair. Such products include products for cutting hair, products for removing hair, products to be applied by a user prior to cutting/removing hair, products to be applied by a user after cutting/removing hair, hair styling products, hair cleaning products, hair conditioning products and hair enhancing products. With such a wide variety of products to choose from and each for different purposes and/or benefits it is not uncommon for a user to have difficulty determining which product or combination of products such as a regimen should be used for their unique needs. In addition, as trends in styles for head hair and facial hair change it is difficult for a user to determine which products are best to be used to obtain and maintain the style they desire.

A variety of methods have been used in other industries such as the cosmetics industry to provide customized product recommendations to users. For example, some methods use a feature-based analysis in which one or more features of a skin condition (e.g., fine lines, wrinkles, spots, uneven skin tone) are detected in a captured image (e.g., a digital photo) by looking for features that meet a definition are commonly used. However, such systems have not addressed the needs for hair cutting, hair removal, hair styling, hair cleaning, and hair conditioning to be used with a particular style.

Accordingly, there remains a need to provide a customized product recommendation to a user that is trying to obtain and maintain a facial hair style.

SUMMARY OF THE INVENTION

A digital imaging method of analyzing pixels of facial-based digital images for determining a user's facial shape type and ability to grow hair and recommending a facial hair style based on the facial shape type and ability to grow hair is provided. A digital facial image from a user is collected by a digital camera. Digital facial images from a plurality of people are collected from a database. A neural network is used to compare a plurality of pixels from the digital facial image of the user to a plurality of pixels from the digital facial images from a plurality of people to determine a facial shape type of the user. A neural network is used to compare a plurality of pixels from the digital facial image of the user to a plurality of pixels form the digital facial images from a plurality of people to determine an ability of the user to grow hair in an area of the user's face. An interface logic in a computing device recommends a facial hair style to the user based on the facial shape type of the user and the ability of the user to grow hair in an area of the user's face.

A product is selected from at least two available products for the user to achieve the recommended facial hair style. The selected product is recommended to the user.

The products comprise a product for cutting hair, a product for removing hair, a product to be applied by the user prior to cutting and/or removing hair, a product to be applied by the user after cutting and/or removing hair, a facial hair styling product, a facial hair cleaning product, a facial hair conditioning product and a hair enhancement product.

The products for cutting hair comprise a multi-blade razor, a single blade razor, a straight razor, a disposable razor, a dry shaver, a trimmer, scissors and clippers.

The products for removing hair comprise a wax, a light-based device, a laser-based device, a depilatory cream, an epilator and an abrasive pad.

The products to be applied by a user prior to cutting and/or removing hair comprise a shave cream, a shave soap, a shave oil, a shave prep, a shave foam and a shave gel.

The products to be applied by the user after cutting and/or removing hair comprise an after-shave lotion, an after-shave balm, an after-shave gel, an oil, a serum and a moisturizer.

The facial hair conditioning product comprises a beard conditioner, a beard oil, a stubble softener, a beard balm, a stubble balm, a beard lotion, a beard moisturizer, a beard cream and a conditioner.

The facial hair cleaning product comprises a shampoo, a soap, a beard wash, a beard soap, a face wash and a face scrub.

The facial hair styling product comprises a comb, a brush, a hair dryer, a curling iron, a hair straightener, a hair gel, a hair mousse, a hair dye, a beard wax, a moustache wax and a styling guide.

The hair enhancement product comprises a hair vitamin, a hair nutritional supplement, a hair thickener, a bald patch concealer and a hair growth minimizing treatment.

The database is a social media database or an online database.

The information is analyzed using a computing device.

The computing device comprises a mobile device, a tablet, a handheld device and a desktop device.

The images comprise pictorial images, photograph images, videos, images from videos and digital images.

The product selected comprises a regimen of two or more products.

The method further comprises the step of providing an image to the user of the recommended facial hair style.

The method further comprises the step of recommending product usage techniques to obtain the recommended facial hair style.

The method further comprising the step of recommending product usage techniques to maintain the recommended facial hair style.

The method further comprising the step of collecting information from the user comprising, the user's age and the user's ethnicity.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate various embodiments described herein, and together with the description serve to explain the principles and operations of the claimed subject matter.

DETAILED DESCRIPTION OF THE INVENTION

Figure 1:
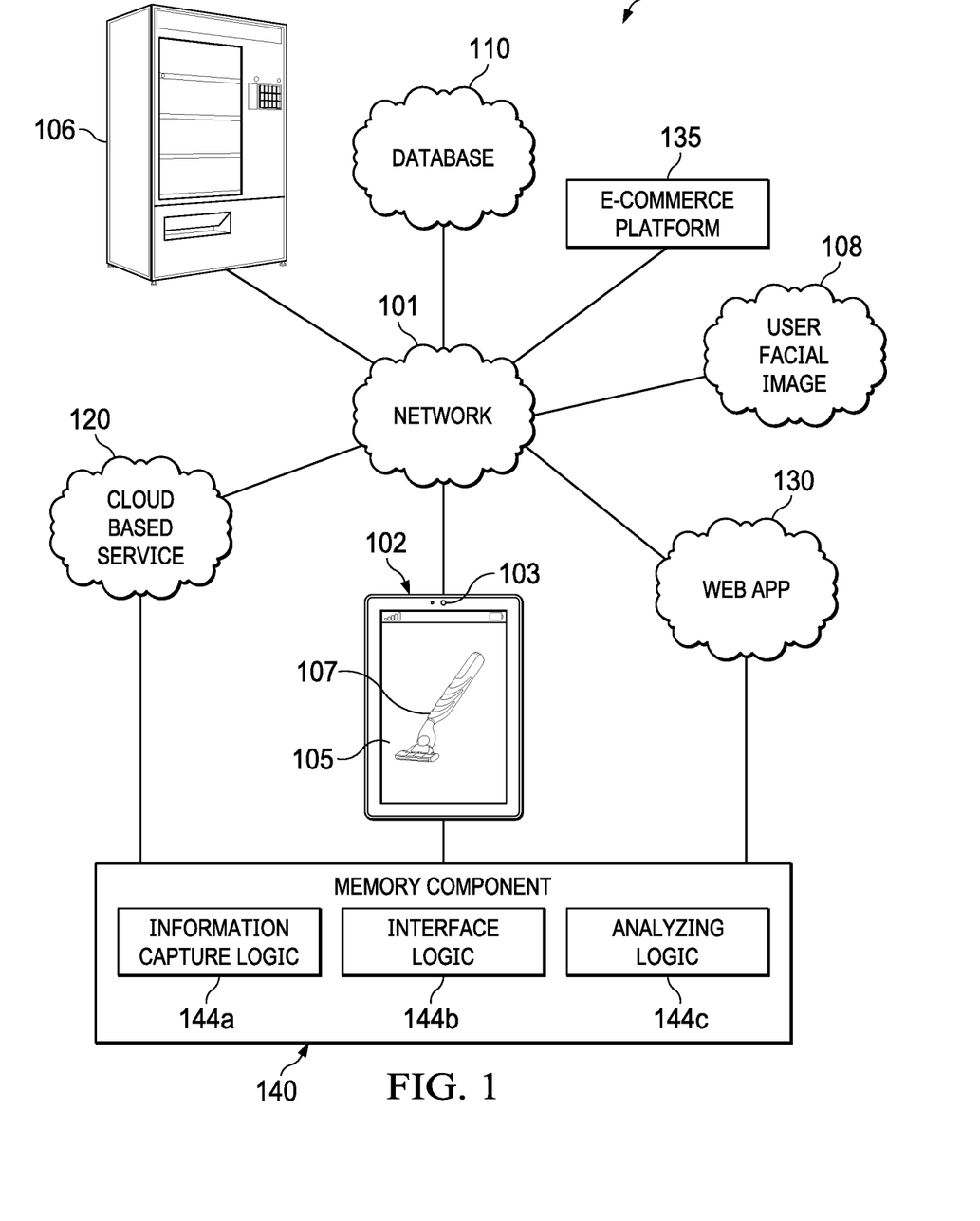
FIG. 1 depicts a computing environment for providing customized product recommendations, according to embodiments described herein.

FIG. 1 depicts a system 100 for collecting information from sources, analyzing the information, and providing a customized product recommendation. The system 100 may include a network 101, which may be embodied as a wide area network (such as a mobile telephone network, a public switched telephone network, a satellite network, the internet, etc.), a local area network (such as wireless-fidelity, Wi-Max, ZigBee™, Bluetooth™, etc.), and/or other forms of networking capabilities. Coupled to the network 101 are a computing device 102, a kiosk computing device 106, a user facial image 108, a database 110, a cloud-based service 120, a web app 130, and/or an e-commerce platform 135.

The computing device 102 may be a mobile device, a handheld device, a mobile telephone, a tablet, a laptop, a personal digital assistant, a desktop device, a desktop computer and/or other computing device configured for collecting, capturing, storing, and/or transferring information such as voice information, pictorial information, video information, written questionnaire and/or digital information such as a digital photograph. Accordingly, the computing device 102 may comprise an image capture device 103 such as a digital camera and may be configured to receive images from other devices (device can capture 2D or 3D information about the surrounding). The computing device 102 may comprise an image display screen 105 to display an image of a person or a product such as a multi-blade razor 107. The computing device 102 may include a memory component 140, which stores information capture logic 144a, interface logic 144b, and analyzing logic 144c. The memory component 140a may include random access memory (such as SRAM, DRAM, etc.), read only memory (ROM), registers, and/or other forms of computing storage hardware. The information capture logic 144a, the interface logic 144b and the analyzing logic 144c may include software components, hardware circuitry, firmware, and/or other computing infrastructure, as described herein. The information capture logic 144a may facilitate capturing, storing, preprocessing, analyzing, transferring, and/or performing other functions on collected information from a user. The interface logic 144b may be configured for providing one or more user interfaces to the user, which may include questions, options, and the like. The analyzing logic 144c may facilitate processing, analyzing, transferring, and/or performing other functions on collected information from a user for selecting a product to be recommended to a user. The mobile computing device 102 may also be configured for communicating with other computing devices via the network 101. The devices may also be linked to an e-commerce platform 135 to enable the user to purchase the product(s) being recommended. The device can also be used to simply move data to and from the cloud where the analysis and storage can be.

The computing device 102 can be used to provide an image to the user of the recommended facial hair style. The computing device 102 can be used to recommend product usage techniques to obtain the recommended facial hair style. The recommendations can be made to the user in written, pictorial, video or a combination of formats. The computing device 102 can be used to recommend product usage techniques to maintain the recommended facial hair style. The recommendations can be made to the user in written, pictorial, video or a combination of formats. The computing device 102 can be used to collect information from the user such as the user's age and the user's ethnicity.

The system 100 may also comprise a kiosk computing device 106. The kiosk computing device 106 may operate similar to the computing device 102 but may also be able to dispense one or more products and/or receive payment in the form of cash or electronic transactions.

While the kiosk computing device 106 is depicted as a vending machine type of device, this is merely an example. Some embodiments may utilize a mobile device that also provides payment and/or production dispensing. Consequently, the hardware and software depicted for the computing device 102 may be included in the kiosk computing device 106 and/or other devices.

The system 100 may also comprise a collected facial image of a user 108. The facial image may be collected by a mobile device, a handheld device, a mobile telephone, a tablet and/or other computing device for collecting, capturing, storing, and/or transferring the facial image. The facial image may be in the form of pictorial images, photograph images, videos, images from videos and digital images.

The system 100 may also comprise a database 110. Database 110 may be any database capable of collecting and storing facial images of a plurality of people. Examples of suitable databases include but are not limited to Facebook, Google, YouTube, and Instagram. Pinterest and Snapchat. The images may comprise pictorial images, photograph images, videos, images from videos and digital images, embedded and un-embedded text, audio, etc.

The system 100 may also comprise a cloud-based service 120. The cloud-based service 120 may include a memory component 140, which stores information capture logic 144a, interface logic 144b and analyzing logic 144c. The memory component 140a may include random access memory (such as SRAM, DRAM, etc.), read only memory (ROM), registers, and/or other forms of computing storage hardware. The information capture logic 144a, the interface logic 144b and the analyzing logic 144c may include software components, hardware circuitry, firmware, and/or other computing infrastructure, as described herein. The information capture logic 144a may facilitate capturing, storing, preprocessing, analyzing, transferring, and/or performing other functions on collected information from a user. The interface logic 144b may be configured for providing one or more user interfaces to the user, which may include questions, options, and the like. The analyzing logic 144c may facilitate processing, analyzing, transferring and/or performing other functions on collected information from a user for selecting a product to be recommended to a user.

The system 100 may also comprise a web app 130. The web app 130 may include a memory component 140, which stores information capture logic 144a, interface logic 144b and analyzing logic 144c. The memory component 140a may include random access memory (such as SRAM, DRAM, etc.), read only memory (ROM), registers, and/or other forms of computing storage hardware. The information capture logic 144a, the interface logic 144b and the analyzing logic 144c may include software components, hardware circuitry, firmware, and/or other computing infrastructure, as described herein. The information capture logic 144a may facilitate capturing, storing, preprocessing, analyzing, transferring, and/or performing other functions on collected information from a user. The interface logic 144b may be configured for providing one or more user interfaces to the user, which may include questions, options, and the like. The analyzing logic 144c may facilitate processing, analyzing, transferring and/or performing other functions on collected information from a user for selecting a product to be recommended to a user.

To provide a customized product recommendation to a user a digital facial image is collected from a user 108 by a digital camera and a plurality of digital facial images from a plurality of people are collected from a database 110. A neural network is used to compare a plurality of pixels from the digital facial image of the user to a plurality of pixels from the digital facial images from a plurality of people to determine a facial shape type of the user. A neural network is used to compare the plurality of pixels from the digital facial image of the user to the plurality of pixels from the digital facial images from a plurality of people to determine an ability of the user to grow hair in an area of the user's face such as the lip, chin and cheek.

Figure 2:
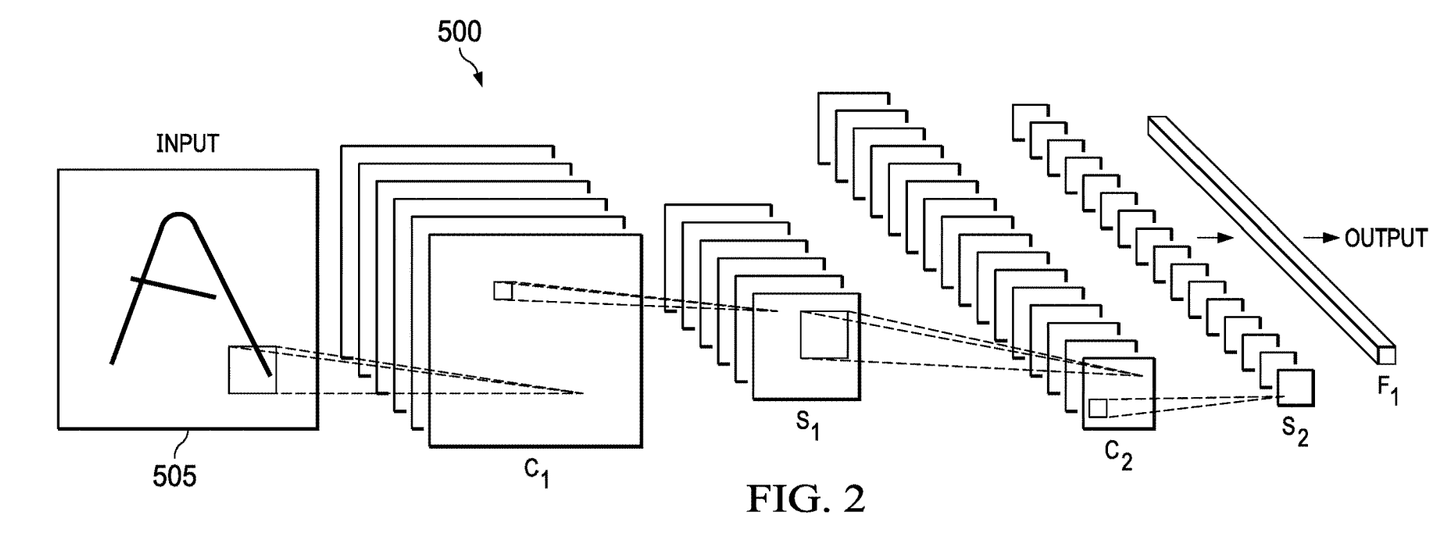
FIG. 2 depicts a structure of a convolutional neural network that may be utilized for identifying features of an image/video, according to embodiments described herein.

FIG. 2 depicts a structure of one type of neural network 500 known as a convolutional neural network (CNN) that may be utilized for identifying a feature of an image, according to embodiments described herein. The CNN 500 may include an inputted image 505, one or more convolution layers C1, C2, one or more sub sampling layers S1 and S2, one or more partially connected layers, one or more fully connected layers, and an output. To begin an analysis or to train the CNN, an image 505 is inputted into the CNN 500 (e.g., the image of a person or a user). The CNN may sample one or more portions of the image to create one or more feature maps in a first convolution layer C1. For example, as illustrated in FIG. 2, the CNN may sample six portions of the image 505 to create six feature maps in the first convolution layer C1. Next, the CNN may subsample one or more portions of the feature map(s) in the first convolution layer C1 to create a first subsampling layer S1. In some instances, the subsampled portion of the feature map may be half the area of the feature map. For example, if a feature map comprises a sample area of 28×28 pixels from the image 505, the subsampled area may be 14×14 pixels. The CNN 500 may perform one or more additional levels of sampling and subsampling to provide a second convolution layer C2 and a second subsampling layer S2. It is to be appreciated that the CNN 500 may include any number of convolution layers and subsampling layers as desired. Upon completion of final subsampling layer (e.g., layer S2 in FIG. 2), the CNN 500 generates a fully connected layer F1, in which every neuron is connected to every other neuron. From the fully connected layer F1, the CNN can generate an output such as a predicted facial hair style. The CNN can be trained to determine a facial shape of the user and can be trained to determine the ability of the user to grow hair in an area of the user's face by either of the three ways. It can be understood that an ensemble of CNN can be used, or CNN can be used with other machine learning methods such as recurrent neural network, support vector machines, K-mean nearest neighbor, etc.

In the first way, the convolutional neural network is trained with pre-identified facial shape types and hair growth abilities. The users input data will be predicted against these retrained classes. The pre-identified items are continuously compared to a population distribution and as distribution shifts the trained classes will be updated and recommendations are made as needed based on the current classes.

In the second way, the convolutional neural network is trained as in the first way and there are four (4) pre-trained classes, class A, B, C, and D for example. The convolutional neural network outputs probabilities of A, B, C, and D. In one instance one can take the largest probability and can call it the class. If one assumes the following image probabilities for the example: A=0.7, B=0.2, C=0.9, D=0.1 (all add to 1) one can say that the image is class A. Alternatively, if the image probabilities for the example are: A=0.4, B=0.4, C=0.3, D=0.1 (all add to 1), one might be able to say that there might be a new class that sits between class A and class B. If for example class A is a soul patch and class B is a moustache, therefore maybe this image might be a goatee. The recommendation is made on the mix probabilities of the predictions.

In the third way one uses a convolutional neural network similar to the one in FaceNet to encode the clusters of facial shapes and hair growth abilities. Using Euclidean Distance (ED) one can assign to one of the pre-ID clusters or dynamically form new clusters based on the ED space. One way to determine the formation of a cluster could be 10% of the images are falling into this new cluster. Clustering can be done automatically but the categorization must be done by a human. The users input data will be predicted against these dynamic classes.

From one of the first three ways a facial shape type of the user and the ability of the user to grow hair in an area of the user's face are identified.

Figure 3A:
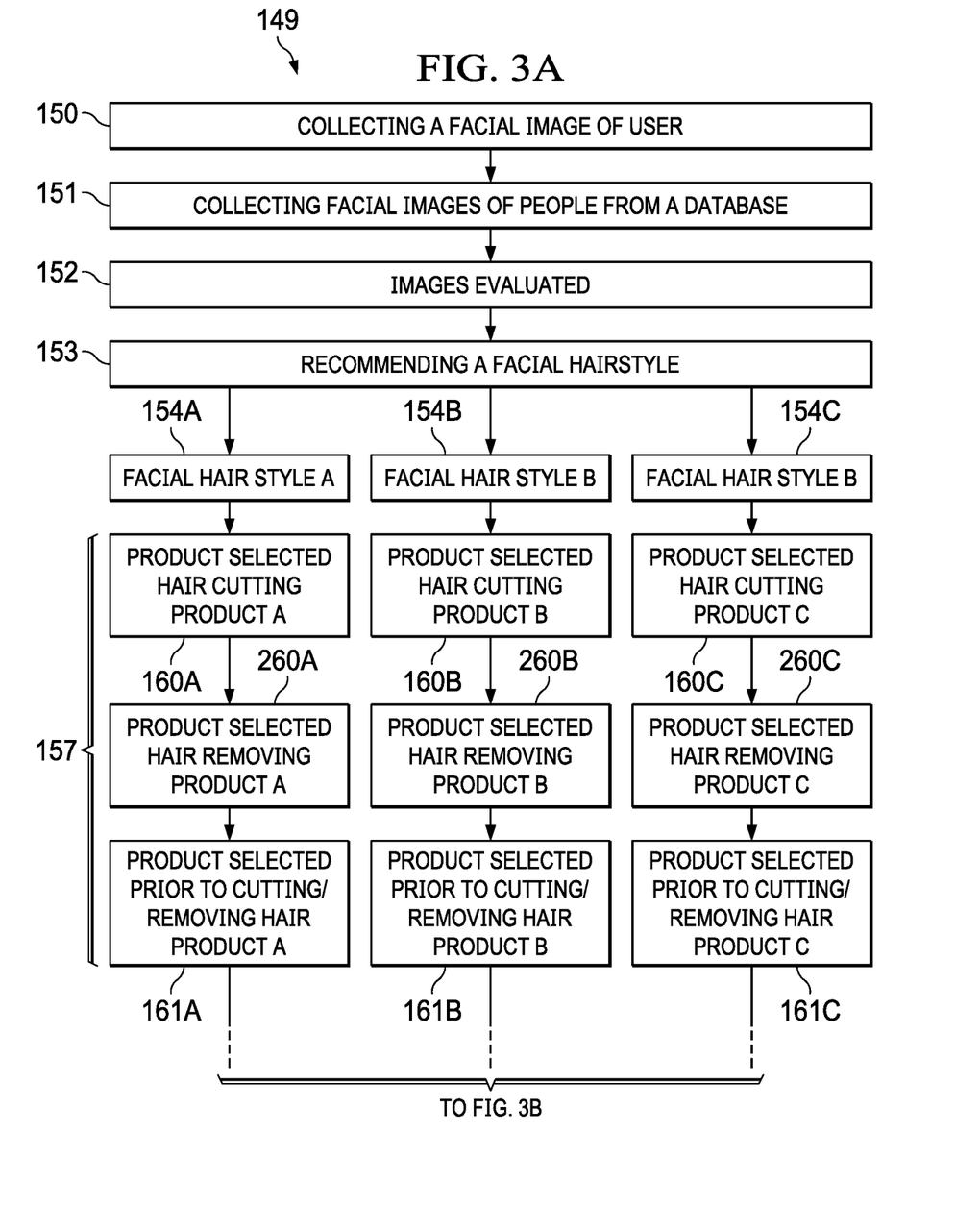
FIG. 3 depicts a flow chart of a method for providing a customized product recommendation to a user.
Figure 3B:
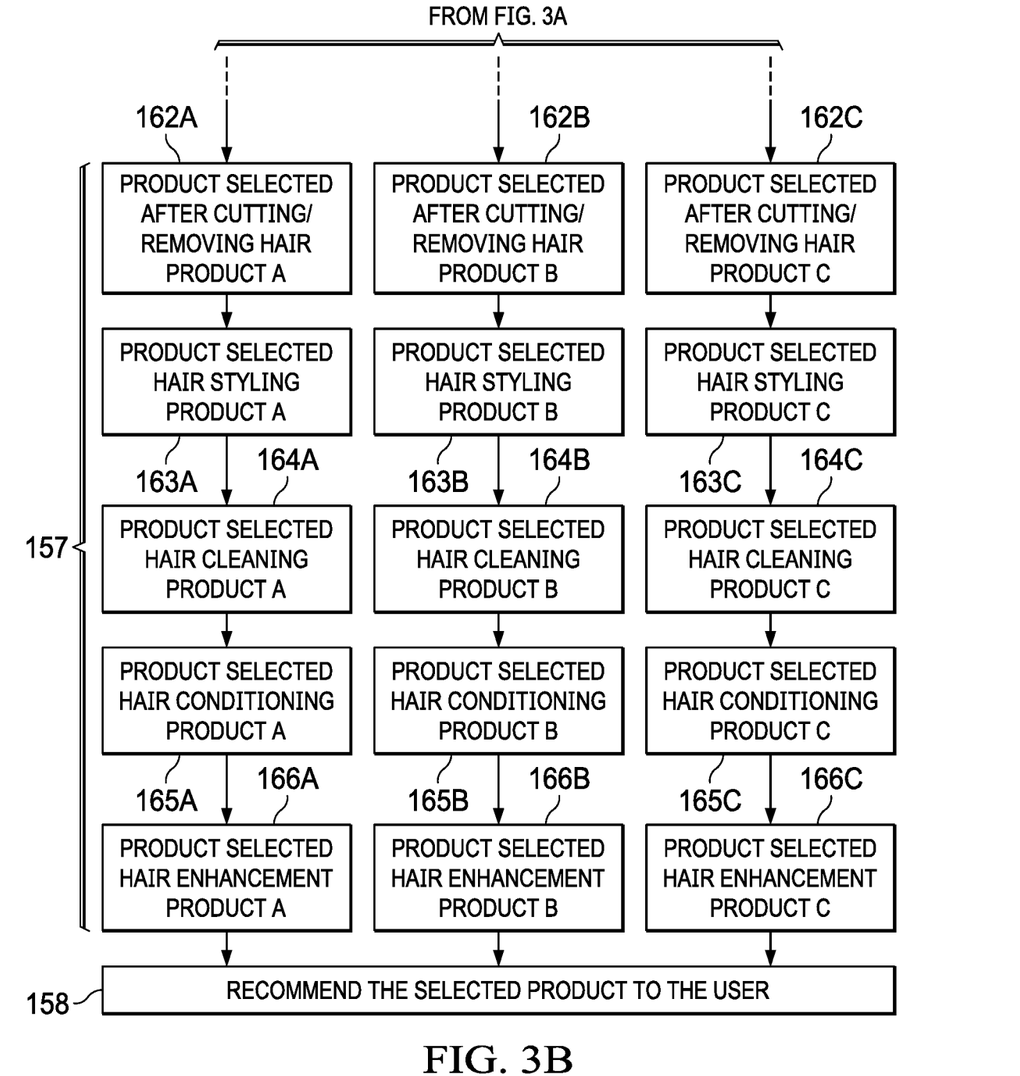

Referring now to FIG. 3 a flow chart 149 is shown. Flow chart 149 includes a method for providing a recommendation of a facial hair style based on the user facial shape type and ability to grow hair in an area of the user's face. The method may also include providing a customized product recommendation to a user. At 150 a digital facial image of a user is collected. At 151 digital facial images of people, individuals are collected from a database. The collected images 150 and 151 are then evaluated at 152 and the pixels from the collected images are evaluated. The pixels of the images are evaluated at 152 using a neural network to determine a facial shape type of the user and an ability of the user to grow hair in an area of the user's face as described previously. Based on the collected and evaluated information 151, 152, a facial hair style is recommended based on the facial shape type of the user and on the ability of the user to grow hair in an area of the user's face at 153. Examples of recommended facial hair styles include facial hair styles A-C at 154A-154C. A product is selected by an analyzing logic in a computing device at 157 for the user to achieve the recommended facial hair style. The product selection 157 is performed from at least two available products based on the user's facial shape type and ability to grow hair in an area of the users face. The selected product is then recommended to the user 158.

Product selection 157 of a product may comprise one or more selections of different types of products. Product selection may comprise selection of a product to use for cutting hair 160A-160C. If facial hair style A is recommended, hair cutting product A is selected 160A. If facial hair style B is recommended, hair cutting product B is selected 160B. If facial hair style C is recommended, hair cutting product C is selected 160C.

Product selection 157 of a product may comprise one or more selections of different types of products. Product selection may comprise selection of a product to use for removing hair 260A-260C. If facial hair style A is recommended, hair removing product A is selected 260A. If facial hair style B is recommended, hair removing product B is selected 260B. If facial hair style C is recommended, hair removing product C is selected 260C.

Product selection 157 may comprise selection of a product to be applied by a user prior to hair cutting/removing 161A-161C. If facial hair style A is recommended, prior to hair cutting/removing product A is selected 161A. If facial hair style B is recommended, prior to hair cutting/removing product B is selected 161B. If facial hair style C is recommended, prior to hair cutting product C is selected 161C.

Product selection 157 may comprise selection of a product to be applied by a user after hair cutting/removing 162A-162C. If facial hair style A is recommended, after hair cutting/removing product A is selected 162A. If facial hair style B is recommended, after hair cutting/removing product B is selected 162B. If facial hair style C is recommended, after hair cutting/removing product C is selected 162C.

Product selection 157 may comprise selection of a hair styling product 163A-163C. If facial hair style A is recommended, hair styling product A is selected 163A. If facial hair style B is recommended, hair styling product B is selected 163B. If facial hair style C is recommended, hair styling product C is selected 163C.

Product selection 157 may comprise selection of a hair cleaning product 164A-164C. If facial hair style A is recommended, hair cleaning product A is selected 164A. If facial hair style B is recommended, hair cleaning product B is selected 164B. If facial hair style C is recommended, hair cleaning product C is selected 164C.

Product selection 157 may comprise selection of a hair conditioning product 165A-165C. If facial hair style A is recommended, hair conditioning product A is selected 165A. If facial hair style B is recommended, hair conditioning product B is selected 165B. If facial hair style C is recommended, hair conditioning product C is selected 165C.

Product selection 157 may comprise selection of a hair enhancement product 166A-166C. If facial hair style A is recommended, hair enhancement product A is selected 165A. If facial hair style B is recommended, hair enhancement product B is selected 165B. If facial hair style C is recommended, hair enhancement product C is selected 165C.

The product selection may comprise a regimen of two or more products. For example, the product selection may be a regimen comprising a product to use for cutting hair 160A and a product to be applied by a user prior to cutting hair 161A. The product selection may be a regimen comprising a product to use for cutting hair 160B, a product to be applied by a user prior to cutting hair 161B and a product to be applied by a user after cutting hair 162B. Other combinations are possible from the choices shown.

After product selection 157 is complete, the selected product is recommended to the user as is shown in FIG. 3. The recommended product allows the user to obtain and then maintain the recommended facial hair style.

Figure 4:
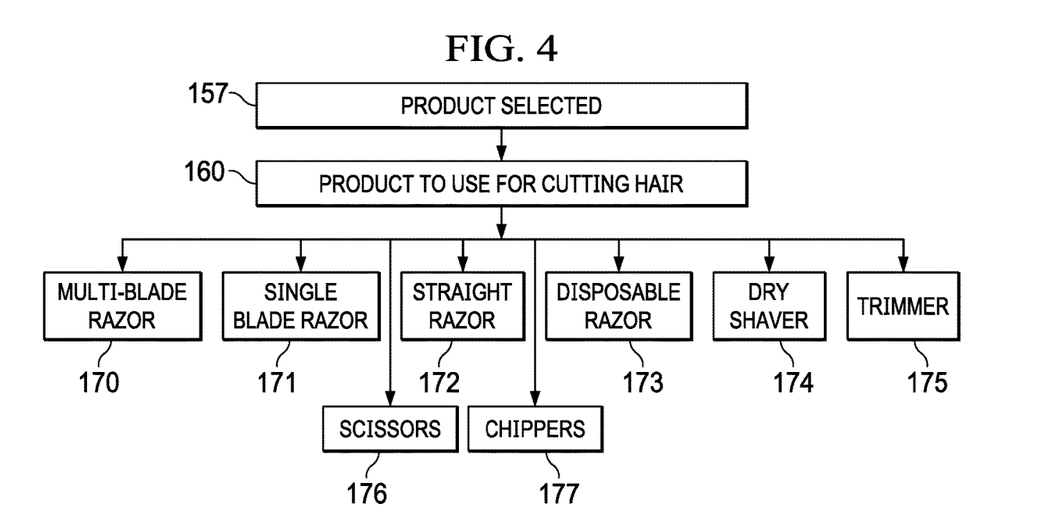
FIG. 4 depicts a chart showing products to be selected from for cutting hair.

Referring now to FIG. 4, there is shown product selection 157 of a product to use for cutting hair 160. Products to be selected from for cutting hair comprise a multi-blade razor 170, a single blade razor 171, a straight razor 172, a disposable razor 173, dry shaver 174, a trimmer 175, scissors 176 and clippers 177.

Figure 5:
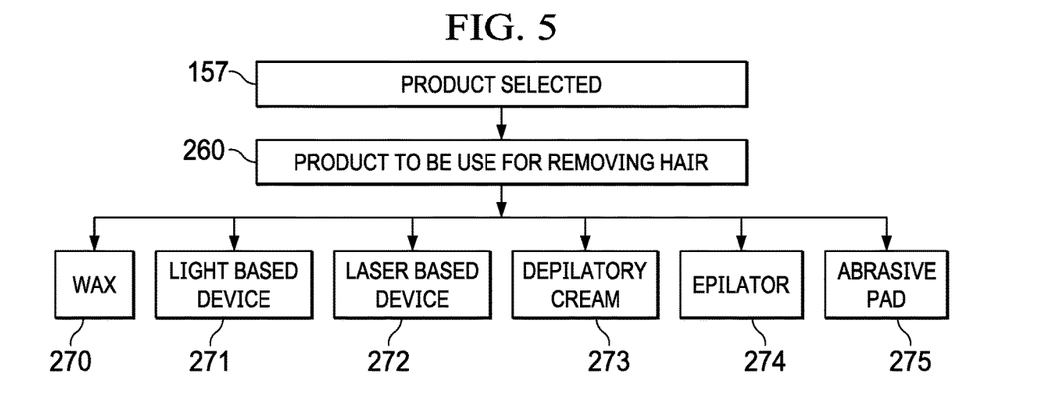
FIG. 5 depicts a chart showing products to be selected from for removing hair.

Referring now to FIG. 5, there is a shown product selection 157 of a product to use for removal of hair 260. Products to be used for removal of hair comprise a wax 270, a light-based device 271, a laser-based device 272, a depilatory cream 273, an epilator 274 and an abrasive pad 275.

Figure 6:
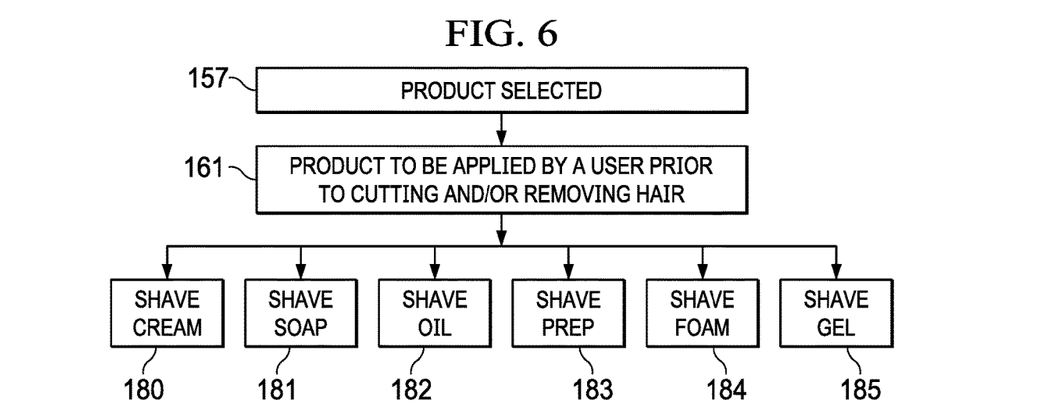
FIG. 6 depicts a chart showing products to be selected from to be applied by a user prior to cutting/removing hair.

Referring now to FIG. 6, there is shown another product selection 157 of a product to be applied by a user prior to hair cutting/removing 161. Products to be selected from to be applied by a user prior to hair cutting/removing comprise a shave cream 180, a shave soap 181, a shave oil 182, a shave prep 183, a shave foam 184 and a shave gel 185.

Figure 7:
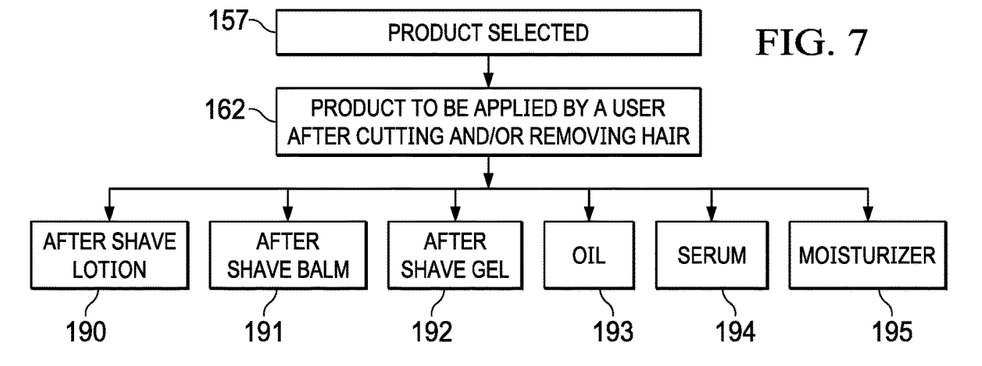
FIG. 7 depicts a chart showing products to be selected from to be applied by a user after cutting/removing hair.

Referring now to FIG. 7, there is shown another product selection 157 of a product to be applied by a user after hair cutting/removing 162. Products to be selected from to be applied by a user after hair cutting/removing comprise an after-shave lotion 190, an after-shave balm 191, an after-shave gel 192, an oil 193, a serum 194 and a moisturizer 195.

Figure 8:
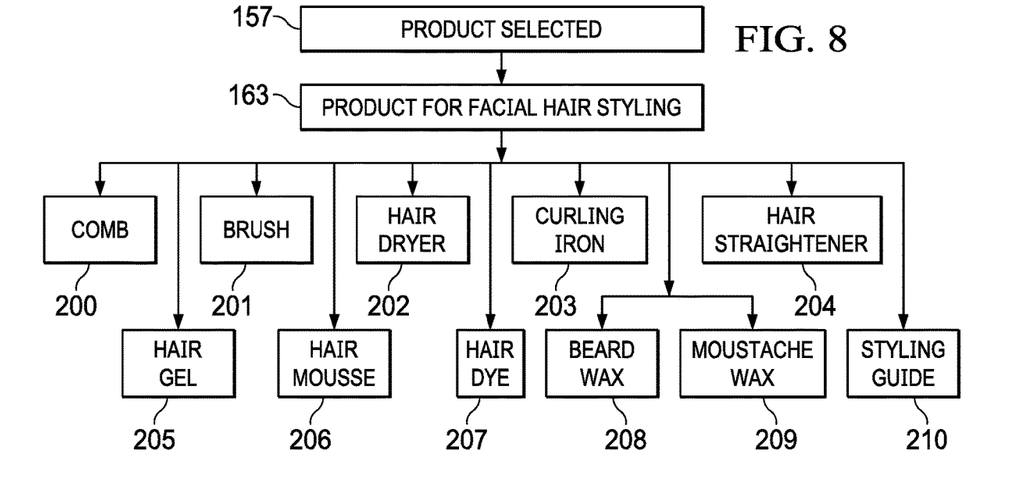
FIG. 8 depicts a chart showing products to be selected from for facial hair styling.

Referring now to FIG. 8 there is shown another product selection 157 of a product to be used for facial hair styling 163. Products to be selected from for facial hair styling comprise a comb 200, a brush 201, a hair dryer 202, a curling iron 203, a hair straightener 204, a hair gel 205, a hair mousse 206, a hair dye 207, a beard wax 208, a moustache wax 209 and a styling guide 210.

Figure 9:
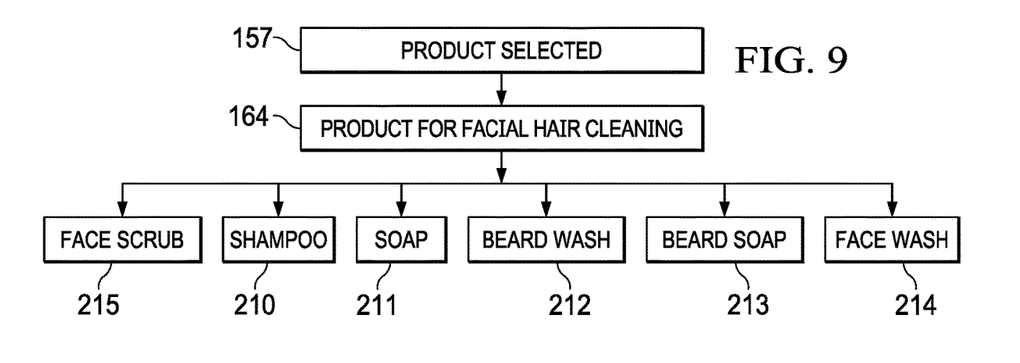
FIG. 9 depicts a chart showing products to be selected from for facial hair cleaning.

Referring now to FIG. 9 there is shown another product selection 157 of a product to be used for facial hair cleaning 164. Products to be selected from for facial hair cleaning comprise a shampoo 210, a soap 211, a beard wash 212 a beard soap 213, a face wash 214 and a face scrub 215.

Figure 10:
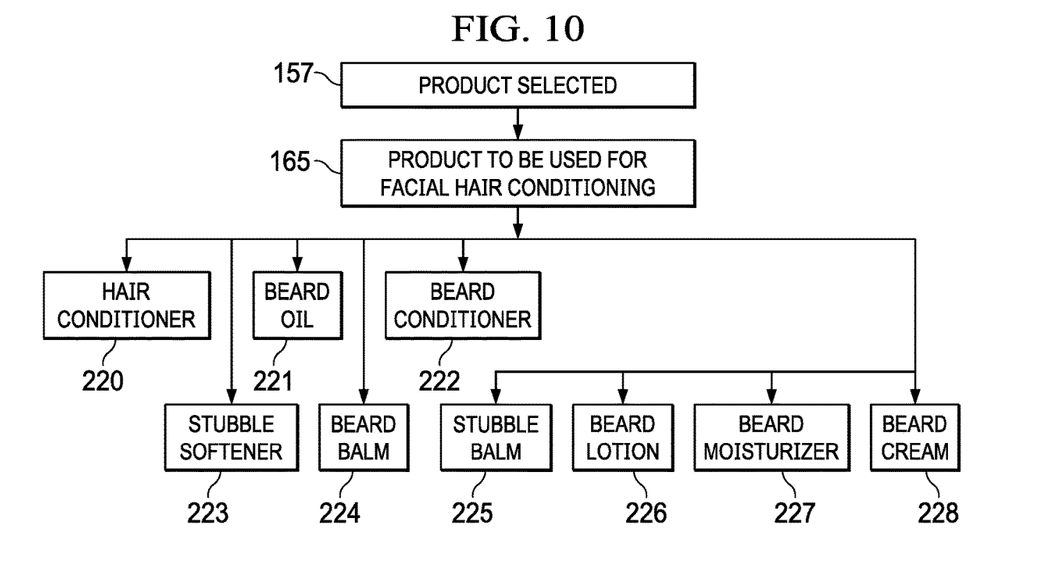
FIG. 10 depicts a chart showing products to be selected from for facial hair conditioning.

Referring now to FIG. 10 there is shown another product selection 157 of a product to be used facial hair conditioning 165. Products to be selected from for facial hair conditioning comprise a hair conditioner 220, a beard oil 221, a beard conditioner 222, a stubble softener 223, a beard balm 224, a stubble balm 225, a beard lotion 226, a beard moisturizer 227 and a beard cream 228.

Figure 11:
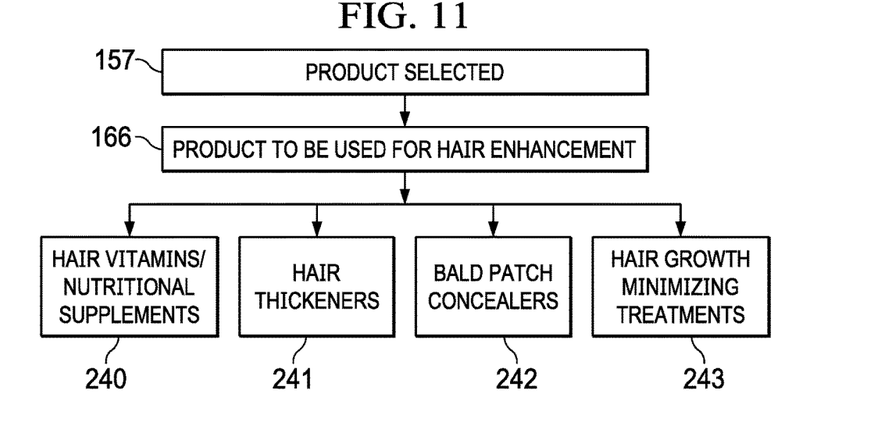
FIG. 11 depicts a chart showing products to be selected from for hair enhancement.

Referring now to FIG. 11 there is shown another product selection 157 of a product to be used for hair enhancement 166. Products to be selected from for hair treatment or enhancement comprise a hair vitamin/hair nutritional supplement 240, a hair thickener 241, a bald patch concealer 242 and a hair growth minimizing treatment 243.

The information collected may also be used to provide users with styling tips and guidance. For example, with some trends information about styling tips and guidance may be useful to enable the user to achieve and maintain the desired style especially if the style is new to the user.

The information collected may also be used to predict product manufacturing, volume and distribution to address the needs of a current trend. For example, a trend may require the use of a product to obtain and/or maintain the trend. With the trend identified a company can produce that product in the right quantities and distribute to the right locations. In addition, the information collected may also be used to develop marketing materials to communicate the trends and the accompanying products to be used with the trends. For example, the information may be used to generate and provided tailored messaging to users practicing a current trend. The information collected may also be used to guide the efforts of product research and development. For example, if a trend is identified and the currently available products are not optimum for addressing the needs of the trend new products may need to be developed to optimize the product performance associated with the trend.

Combinations

An example is below:
A. A digital imaging method of analyzing pixels of facial-based digital images for determining a user's facial shape type and ability to grow hair and recommending a facial hair style based on the facial shape type and ability to grow hair, the digital imaging method comprising the steps of:
   a. collecting by a digital camera a digital facial image from a user;
   b. collecting digital facial images from a plurality of people from a database;
   c. using a neural network to compare a plurality of pixels from the digital facial image of the user to a plurality of pixels from the digital facial images from a plurality of people to determine a facial shape type of the user;
   d. using a neural network to compare a plurality of pixels from the digital facial image of the user to a plurality of pixels form the digital facial images from a plurality of people to determine an ability of the user to grow hair in an area of the user's face; and
   e. recommending by an interface logic in a computing device a facial hair style to the user based on the facial shape type of the user and the ability of the user to grow hair in an area of the user's face.
B. The method of paragraph A, further comprising the steps of:
   f. selecting by an analyzing logic in the computing device a product from at least two available products for the user to achieve the recommended facial hair style based on the facial shape type of the user and the ability of the user to grow hair in an area of the user's face; and
   g. recommending by an interface logic in the computing device the selected product to the user
C. The method of paragraph B, wherein the products comprise a product for cutting hair, a product for removing hair, a product to be applied by the user prior to cutting and/or removing hair, a product to be applied by the user after cutting and/or removing hair, a facial hair styling product, a facial hair cleaning product, a facial hair conditioning product and a hair enhancement product.
D. The method of paragraph C, wherein the products for cutting hair comprise a multi-blade razor, a single blade razor, a straight razor, a disposable razor, a dry shaver a trimmer, scissors and clippers.
E. The method of paragraph C, wherein the products for removing hair comprise a wax, a light-based device, a laser-based device, a depilatory cream, an epilator and an abrasive pad.
F. The method of paragraph C, wherein the products to be applied by a user prior to cutting and/or removing hair comprise a shave cream, a shave soap, a shave oil, a shave prep, a shave foam and a shave gel.
G. The method of paragraph C, wherein the products to be applied by the user after cutting and/or removing hair comprise an after-shave lotion, an after-shave balm, an after-shave gel, an oil, a serum and a moisturizer.
H. The method of paragraph C, wherein the facial hair conditioning product comprises a beard conditioner, a beard oil, a stubble softener, a beard balm, a stubble balm, a beard lotion, a beard moisturizer, a beard cream and a conditioner.
I. The method of paragraph C, wherein the facial hair cleaning product comprises a shampoo, a soap, a beard wash, a beard soap, a face wash and a face scrub.
J. The method of paragraph C, wherein the facial hair styling product comprises a comb, a brush, a hair dryer, a curling iron, a hair straightener, a hair gel, a hair mousse, a hair dye, a beard wax, a moustache wax and a styling guide.
K. The method of paragraph C, wherein the hair enhancement product comprises a hair vitamin, a hair nutritional supplement, a hair thickener, a bald patch concealer and a hair growth minimizing treatment.
L. The method of any one of the preceding paragraphs, wherein the database is a social media database.
M. The method of any one of the preceding paragraphs, wherein the database is an online database.
N. The method of any one of the preceding paragraphs, wherein the information is analyzed using a computing device.
O. The method of paragraph N, wherein the computing device comprises a mobile device, a tablet, a handheld device and a desktop device.
P. The method of any one of the preceding paragraphs, wherein the images comprise pictorial images, photograph images, videos, images from videos and digital images.
Q. The method of any one of the preceding paragraphs, wherein the product selected comprises a regimen of two or more products.
R. The method of any one of the preceding paragraphs, further comprising the step of providing an image to the user of the recommended facial hair style.
S. The method of any one of the preceding paragraphs, further comprising the step of recommending product usage techniques to obtain the recommended facial hair style.
T. The method of any one of the preceding paragraphs, further comprising the step of recommending product usage techniques to maintain the recommended facial hair style.
U. The method of any one of the preceding paragraphs, further comprising the step of collecting information from the user comprising, the user's age and the user's ethnicity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A digital imaging method of analyzing pixels of facial-based digital images for determining a users facial shape type and ability to grow hair and recommending a facial hair style based on the facial shape type and ability to grow hair, the digital imaging method comprising the steps of:
 a. collecting by a digital camera a digital facial image from a user;
 b. collecting digital facial images from a plurality of people from a database;
 c. using a neural network to compare a plurality of pixels from the digital facial image of the user to a plurality of pixels from the digital facial images from a plurality of people to determine a facial shape type of the user;
 d. using a neural network to compare a plurality of pixels from the digital facial image of the user to a plurality of pixels form the digital facial images from a plurality of people to determine an ability of the user to grow hair in an area of the user's face; and
 e. recommending by an interface logic in a computing device a facial hair style to the user based on the facial shape type of the user and the ability of the user to grow hair in an area of the user's face.

2. The method of claim 1, further comprising the steps of:
 f. selecting by an analyzing logic in the computing device a product from at least two available products for the user to achieve the recommended facial hair style based on the facial shape type of the user and the ability of the user to grow hair in an area of the user's face; and
 g. recommending by an interface logic in the computing device the selected product to the user.

3. The method of claim 2, wherein the products comprise a product for cutting hair, a product for removing hair, a product to be applied by the user prior to cutting and/or removing hair, a product to be applied by the user after cutting and/or removing hair, a facial hair styling product, a facial hair cleaning product, a facial hair conditioning product and a hair enhancement product.

4. The method of claim 3, wherein the products for cutting hair comprise a multi-blade razor, a single blade razor, a straight razor, a disposable razor, a dry shaver, a trimmer, scissors and clippers.

5. The method of claim 3, wherein the products for removing hair comprise a wax, a light-based device, a laser-based device, a depilatory cream, an epilator and an abrasive pad.

6. The method of claim 3, wherein the products to be applied by a user prior to cutting and/or removing hair comprise a shave cream, a shave soap, a shave oil, a shave prep, a shave foam and a shave gel.

7. The method of claim 3, wherein the products to be applied by the user after cutting and/or removing hair comprise an after-shave lotion, an after-shave balm, an after-shave gel, an oil, a serum and a moisturizer.

8. The method of claim 3, wherein the facial hair conditioning product comprises a beard conditioner, a beard oil, a stubble softener, a beard balm, a stubble balm, a beard lotion, a beard moisturizer, a beard cream and a conditioner.

9. The method of claim 3, wherein the facial hair cleaning product comprises a shampoo, a soap, a beard wash, a beard soap, a face wash and a face scrub.

10. The method of claim 3, wherein the facial hair styling product comprises a comb, a brush, a hair dryer, a curling iron, a hair straightener, a hair gel, a hair mousse, a hair dye, a beard wax, a moustache wax and a styling guide.

11. The method of claim 3, wherein the hair enhancement product comprises a hair vitamin, a hair nutritional supplement, a hair thickener, a bald patch concealer and a hair growth minimizing treatment.

12. The method of claim 1 wherein the database is a social media database or an online database.

13. The method of claim 1 wherein the information is analyzed using a computing device.

14. The method of claim 13, wherein the computing device comprises a mobile device, a tablet, a handheld device and a desktop device.

15. The method of claim 1, wherein the product selected comprises a regimen of two or more products.

16. The method of claim 1, further comprising the step of providing an image to the user of the recommended facial hair style.

17. The method of claim 1, further comprising the step of recommending product usage techniques to obtain the recommended facial hair style.

18. The method of claim 1, further comprising the step of recommending product usage techniques to maintain the recommended facial hair style.

19. The method of claim 1, further comprising the step of collecting information from the user comprising, the user's age and the user's ethnicity.

* * * * *